(12) United States Patent
Jiang et al.

(10) Patent No.: US 12,511,384 B2
(45) Date of Patent: Dec. 30, 2025

(54) COMPUTER VIRUS INTERCEPTION METHOD, SYSTEM AND COMPUTER PROGRAM PRODUCT

(71) Applicant: EverMore Technology Inc., Hsinchu (TW)

(72) Inventors: Jia-You Jiang, Hsinchu (TW); Wu-Hsiung Huang, Hsinchu (TW); Tsu-Pin Weng, Hsinchu (TW); Yi-Chi Lai, Hsinchu (TW); Yi-Yuan Ho, Hsinchu (TW); Edward Ju, Fremont, CA (US); Yuan-Sheng Chen, Hsinchu (TW); Hung-Ming Chen, Hsinchu (TW)

(73) Assignee: EverMore Technology Inc., Hsinchu (TW)

( * ) Notice: Subject to any disclaimer, the term of this patent is extended or adjusted under 35 U.S.C. 154(b) by 63 days.

(21) Appl. No.: 18/678,718

(22) Filed: May 30, 2024

(65) Prior Publication Data
US 2025/0200178 A1    Jun. 19, 2025

(30) Foreign Application Priority Data

Dec. 13, 2023   (TW) ................................ 112148570

(51) Int. Cl.
G06F 21/56    (2013.01)
H04L 9/08    (2006.01)
H04L 9/32    (2006.01)

(52) U.S. Cl.
CPC .......... *G06F 21/561* (2013.01); *H04L 9/0869* (2013.01); *H04L 9/3213* (2013.01); *G06F 2221/034* (2013.01)

(58) Field of Classification Search
CPC ............ G06F 21/561; G06F 2221/034; H04L 9/0869; H04L 9/3213
USPC ......................................................... 713/159
See application file for complete search history.

(56) References Cited

U.S. PATENT DOCUMENTS

| | | | |
|---|---|---|---|
| 11,328,052 B2 * | 5/2022 | Mckenzie | ............... G06F 21/44 |
| 2007/0104054 A1 * | 5/2007 | Senshu | ............ G11B 20/00876 |
| | | | 369/47.12 |
| 2009/0100458 A1 * | 4/2009 | Chan | ..................... H04L 67/567 |
| | | | 725/34 |
| 2011/0126279 A1 * | 5/2011 | Senshu | ............ G11B 20/00086 |
| | | | 726/16 |

(Continued)

*Primary Examiner* — Thanh T Le
(74) *Attorney, Agent, or Firm* — Demian K. Jackson; Jackson IPG PLLC

(57) ABSTRACT

The present invention relates to a computer virus interception method. The method includes: executing the following steps by a processor unit: providing for a user to configure a default software status list by operating a default status configuration interface, wherein the default software status list includes a plurality of macro application software; providing for the user to configure a software whitelist by operating a software whitelist configuration interface; providing for the user to configure a hardware whitelist by operating a hardware whitelist configuration interface; and performing an identity re-authentication process to re-authenticate an identity information of the user when one of a default status change operation, a software whitelist change operation, a hardware whitelist change operation, and a software whitelist anomaly is detected.

9 Claims, 10 Drawing Sheets

(56) References Cited

U.S. PATENT DOCUMENTS

| | | | |
|---|---|---|---|
| 2012/0131645 A1* | 5/2012 | Harm | G06F 21/6218 726/4 |
| 2014/0040443 A1* | 2/2014 | Syu | H04W 24/02 709/222 |
| 2016/0188205 A1* | 6/2016 | Rao | H04M 1/72466 715/773 |
| 2017/0206351 A1* | 7/2017 | Jay | H04W 12/088 |
| 2018/0268144 A1* | 9/2018 | Warpinski | G06F 21/85 |
| 2018/0365429 A1* | 12/2018 | Segal | H04L 67/535 |
| 2019/0347181 A1* | 11/2019 | Cranfill | H04L 63/102 |
| 2020/0084214 A1* | 3/2020 | Pini | H04M 15/885 |
| 2020/0184045 A1* | 6/2020 | Mills | G06F 8/65 |
| 2022/0113234 A1* | 4/2022 | Tremblay | G01N 3/22 |
| 2023/0108145 A1* | 4/2023 | Ma | G06F 11/0769 718/108 |
| 2025/0097199 A1* | 3/2025 | Law | H04L 63/0209 |
| 2025/0131081 A1* | 4/2025 | Chandra | G06F 21/572 |

* cited by examiner

COMPUTER VIRUS INTERCEPTION METHOD, SYSTEM AND COMPUTER PROGRAM PRODUCT

CROSS-REFERENCE TO RELATED APPLICATION

This application claims priority benefit to Taiwan Invention Patent Application Serial No. 112148570, filed on Dec. 13, 2023, in Taiwan Intellectual Property Office, the entire disclosures of which are incorporated by reference herein.

FIELD

The present invention relates to a computer virus interception method, system and computer program product, in particular to a computer virus interception method, system and computer program product capable of intercepting macro computer viruses.

BACKGROUND

Nowadays, with the widespread popularity of computer network communication, large amounts of data files are frequently transferred between computers. Although most of these files contain only digital data, some may contain executable code, thus creating favourable conditions for the spread of macro viruses.

Macro viruses are malicious code compiled using macro languages and embedded in data files. When users open applications such as WORD, EXCEL and PowerPoint and unknowingly run macros, they can be infected by macro viruses. Some macro viruses can even run automatically without user intervention.

Similar to general computer viruses, macro viruses can cause various types of damage to a user's computer, including deleting or modifying files, locking files, damaging system functionality, or stealing sensitive data, leading to a variety of cybersecurity issues. In addition, macro viruses can replicate and infect other clean files. In environments where files are transferred extensively, they can spread and propagate rapidly, causing more widespread damage.

In response to macro viruses, although conventional technologies have developed various techniques to detect and protect against them, including virus code scanning, checksum comparison, full-text file scanning and signature scanning technologies, macro viruses that do not reside in executable files can easily evade virus scanning processes. In addition, because they are hidden within data files, they can also easily evade virus detection processes.

In addition, the number and variants of macro viruses continue to increase, and their evolution is accelerating. The pace of development of antivirus technology cannot keep up with the evolution of viruses, so new antivirus technologies are quickly rendered obsolete. It's no exaggeration to say that today's computer networks are plagued by a vast number of unknown macro viruses.

Hence, there is a need to solve the above deficiencies/issues.

SUMMARY

The present invention relates to a computer virus interception method, system and computer program product, in particular to a computer virus interception method, system and computer program product capable of intercepting macro computer viruses.

Accordingly, the present invention provides a computer virus interception method. The method includes: performing following steps by a processor unit: providing for a user to configure a default software status list by operating a default status configuration interface, wherein the default software status list includes a plurality of macro application software; providing for the user to configure a software whitelist by operating a software whitelist configuration interface; providing for the user to configure a hardware whitelist by operating a hardware whitelist configuration interface; and executing an identity re-authentication process to re-authenticate the identity information/credentials of the user when one of a default status change operation, a software whitelist change operation, a hardware whitelist change operation, and a software whitelist anomaly is detected.

The present invention further provides a computer virus interception computer program product, which is embodied on a non-transitory computer-readable storage medium and loaded and executed by a processor unit. The product includes: a default status configuration module configured to provide for a user to configure a default software status list by operating a default status configuration interface, wherein the default software status list includes a plurality of macro application software; a software whitelist configuration module configured to provide for the user to configure a software whitelist by operating a software whitelist configuration interface; a hardware whitelist configuration module configured to provide for the user to configure a hardware whitelist by operating a hardware whitelist configuration interface; and an identity re-authentication management module configured to detect whether a trigger event occurs, and when the occurrence of the trigger event is detected, performing the identity re-authentication process to re-authenticate the identity information of the user, wherein the trigger event includes one of a default status change operation changing the default software status list, a software whitelist change operation changing the software whitelist, a hardware whitelist change operation changing the hardware whitelist, and a software whitelist anomaly.

The present invention further provides a computer virus interception system. The system includes: a computer virus protection computer including a processor unit configured to execute following steps: providing for a user to configure a default software status list by operating a default status configuration interface, wherein the default software status list includes a plurality of macro application software; providing for the user to configure a software whitelist by operating a software whitelist configuration interface; providing for the user to configure a hardware whitelist by operating a hardware whitelist configuration interface; and performing an identity re-authentication process to re-authenticate the identity information of the user when one of a default status change operation, a software whitelist change operation, a hardware whitelist change operation, and a software whitelist anomaly is detected.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

Figure 1:
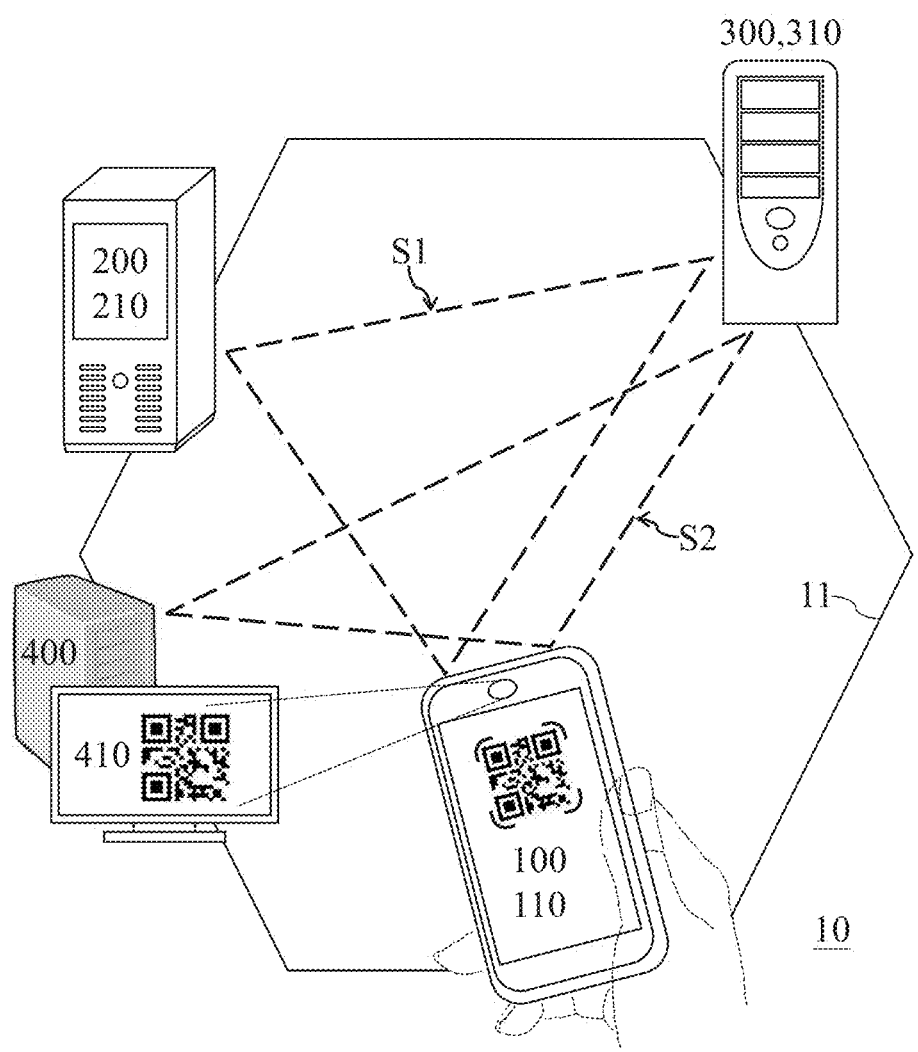
FIG. 1 is a schematic diagram illustrating the system architecture for the virus interception system included in the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn to scale for illustrative purposes. The dimensions and the relative dimensions do not necessarily correspond to actual reductions to practice. It is clear that other embodiments can be configured according to the knowledge of persons skilled in the art without departing from the true technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the statused features, integers, steps or components as referred to, but does not preclude the presence or addition of one or more other features, integers, steps or components, or groups thereof. Thus, the scope of the expression "a device including means A and B" should not be limited to devices consisting only of components A and B.

FIG. 1 is a schematic diagram illustrating the system architecture for the virus interception system included in the present invention. In some embodiments, the virus interception system 10 includes at least a user device 100, an application server 200, a cybersecurity server 300, and a virus protection computer 400. There are multiple transmission connections that are established among these devices via a network 11 to enable these devices to be communicatively connected with one another for communication and data transmission. The network 11 covers an external network (Internet), an internal network (Intranet), or a combination thereof.

The user device 100 preferably includes, but is not limited to, a desktop computer, a laptop computer, a tablet device, and a smartphone. The cybersecurity server 300 is a third-party intermediary security device established and provided by a cybersecurity service provider, and preferably includes, but is not limited to, a security intermediary server or a cloud server.

The virus protection computer 400 refers to any electronic computing device that has requirements to execute a macro, and preferably includes, but is not limited to, a desktop computer, a laptop computer, a factory main control node, an industrial control system security device, an Internet of Things (IoT) device, a workstation, a firewall system, an intrusion detection system, a database protection device, an encryption device, a security authentication device, and an information security device, etc.

The virus interception system 10 includes a first subsystem S1 and a second subsystem S2, wherein the first subsystem S1 includes the user device 100, the application server 200, and the cybersecurity server 300, as well as the second subsystem S2 that includes the user device 100, the virus protection computer 400, and the cybersecurity server 300. The first subsystem S1 is used to implement a first-tier multi-party multi-factor dynamic strong encryption identity authentication method 500, and the second subsystem S2 is used to implement a second-tier multi-party multi-factor dynamic strong encryption identity authentication method, which is also known as an identity re-authentication process 600.

A first service program 110, a second service program 210, a third service program 310 and a fourth service program 410 are installed in the user device 100, the application server 200, the cybersecurity server 300 and the virus protection computer 400, respectively. In addition, an operating system is installed in the virus protection computer 400.

The virus interception method included in the present invention is preferably implemented under the system architecture of the virus interception system 10 and reduced to practice in the form of a computer program including the first service program 110, the second service program 210, the third service program 310, and the fourth service program 410.

In some embodiments, the first service program 110, the second service program 210, the third service program 310, and the fourth service program 410 are preferably a set of virus interception service program suites developed and managed by a third-party cybersecurity service provider. The first service program 110 and the fourth service program 410 each functions as a frontend interface application, while the second service program 210 and the third service program 310 each functions as a backend platform.

The first service program 110, which is, for example, a software App named TekPass, is preferably an application program (App) running on a smartphone that is an exemplary user device 100. The first service program 110 is embedded with a set of identity information (ID), which preferably includes an identification code or an installation identifier provided by the App itself, or a unique identity code (ID code) assigned and given by the third-party cybersecurity service provider.

The fourth service program 410, which is, for example, a software App named TP-AVK, is preferably an application software running under the operating system on the virus protection computer 400. The fourth service program 410 is configured to operate in the form of a daemon program on the virus protection computer 400, and has the authority to modify the registry in the operating system.

In some embodiments, the user device 100 is preferably a smartphone owned and used by the user, and the virus protection computer 400 is preferably a personal computer owned and used by the user as well. The operating system (OS) for the personal computer is preferably Microsoft® Windows®, under which the Microsoft® Office suite is installed, including applications such as Outlook®, WORD®, EXCEL®, Power Point®, etc. Since applications such as Outlook®, WORD®, EXCEL®, and Power Point® execute macro commands that are likely to carry macro viruses, the virus protection computer 400 is exposed to the risk of infection by computer viruses.

The virus interception method according to the present invention includes a first-tier multi-party multi-factor dynamic strong encryption identity authentication method implemented based on the first subsystem S1, and a second-tier multi-party multi-factor dynamic strong encryption identity authentication method or also known as an identity re-authentication process implemented based on the second subsystem S2.

Figure 2:
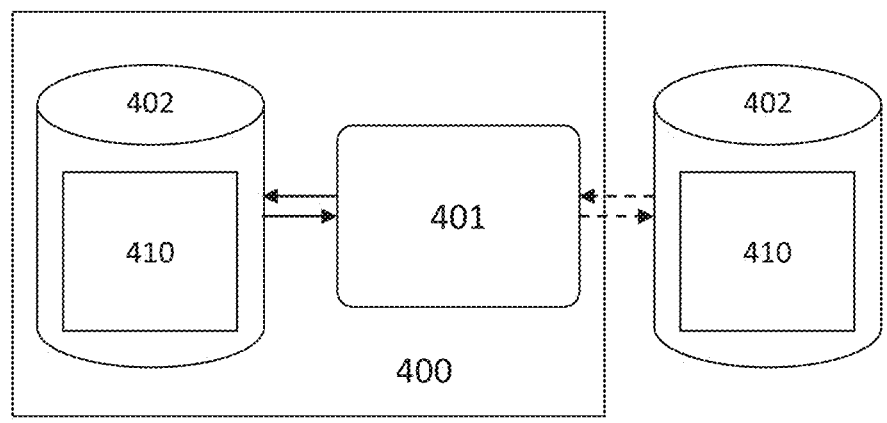
FIG. 2 is a schematic diagram illustrating the hardware architecture for the virus protection computer included in the present invention.

FIG. 2 is a schematic diagram illustrating the hardware architecture for the virus protection computer included in the present invention. The virus protection computer 400 according to the present invention has a hardware architecture that includes at least one processor unit 401 and at least one storage medium 402. The storage medium 402 is preferably a local storage medium installed within the virus protection computer 400, or an externally-connected external storage device. In some embodiments, the fourth service program (the virus interception computer program product) 410 is pre-installed on the virus protection computer 400 and stored in the storage medium 402, and is loaded into and executed by the processor unit 401 within the virus protection computer 400.

Figure 3:
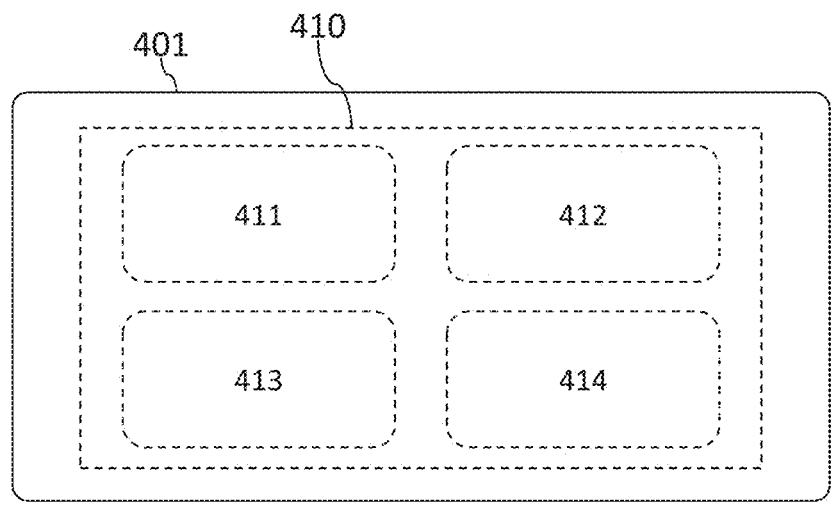
FIG. 3 is a block diagram illustrating the multiple programming modules that are executable by the processor units included in the fourth service program according to the present invention.

FIG. 3 is a block diagram illustrating the multiple programming modules that are executable by the processor units and are included in the fourth service program according to the present invention. The fourth service program 410 includes multiple programming modules, all of which are pre-stored on the storage medium 402, and are executed by the processor unit 401, after being loaded into the processor unit 401. These programming modules include, but are not limited to: a default status configuration module 411, a software whitelist configuration module 412, a hardware whitelist configuration module 413, and an identity re-authentication management module 414.

Figure 4:
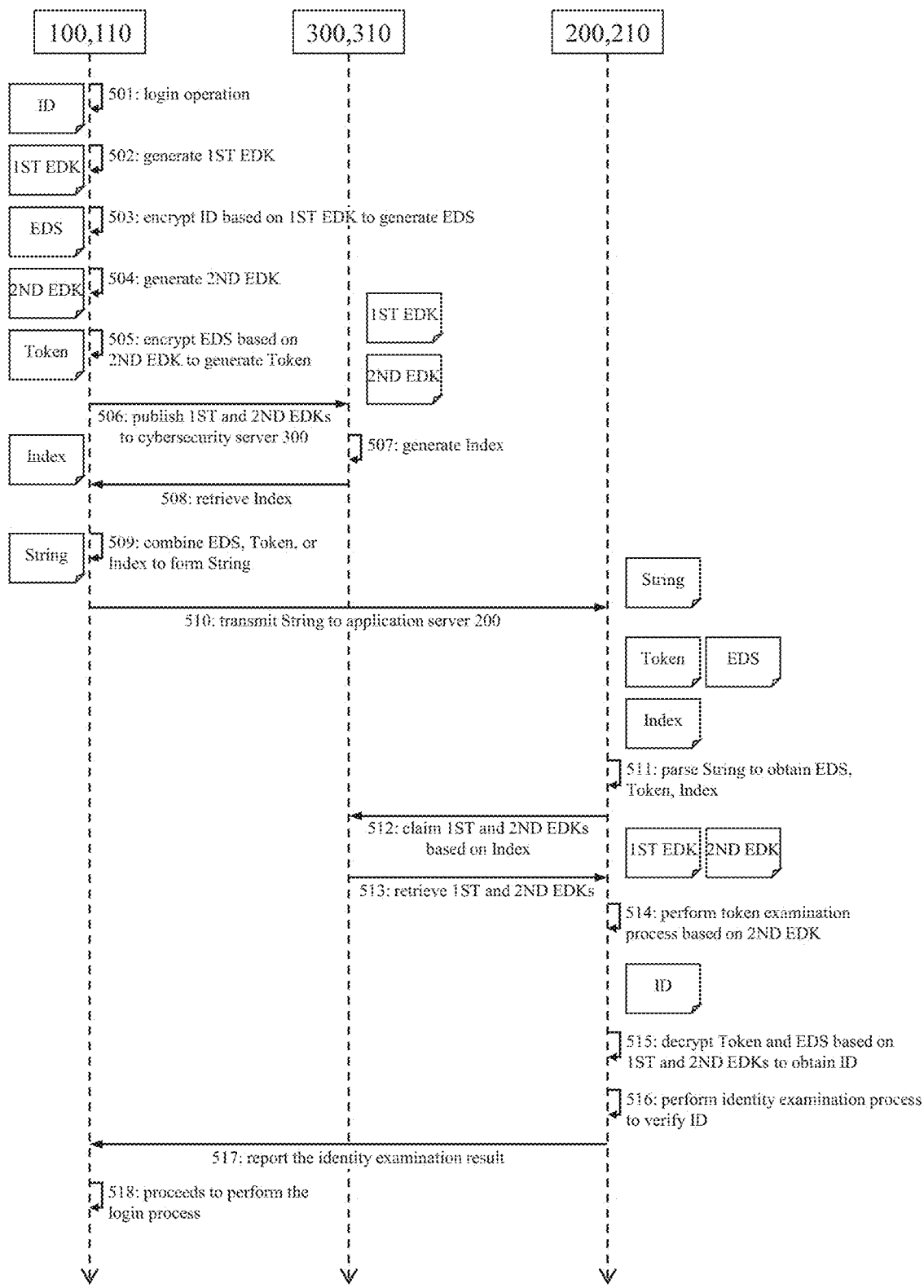
FIG. 4 is a sequence diagram illustrating the implementation steps for the first-tier multi-party multi-factor dynamic strong encryption identity authentication method included in the present invention.

FIG. 4 is a sequence diagram illustrating the implementation steps for the first-tier multi-party multi-factor dynamic strong encryption identity authentication method included in the present invention. The first-tier multi-party multi-factor dynamic strong encryption identity authentication method 500 includes the steps as follows.

Step 501: Initially, the user performs a login operation on the user device 100 so as to log into the first service program 110. For example, by entering the account name and password into the corresponding fields on the login page provided by the first service program 110 so as to log into the first service program 110.

Step 502: In response to the login operation from the user, the first service program 110 is configured to generate, in a random manner or by implementing a first cryptographic algorithm, a first ephemeral decryption key (EDK) of, for example, 32 bytes in length and an initialization vector (IV) thereof.

The first cryptographic algorithm is preferably one selected from an MD5 algorithm, an MD4 algorithm, an MD2 algorithm, an SHA-1 algorithm, an SHA-2 algorithm, an SHA-3 algorithm, a RIPEMD-160 algorithm, an MDC-2 algorithm, a GOST R 34.11-94 algorithm, a BLAKE2 algorithm, a Whirlpool algorithm, an SM3 algorithm, and combinations thereof.

Step 503: After the first ephemeral decryption key (the first EDK/1st EDK) is generated on the user device 100, the first service program 110 continues on the user device 100, based on the first EDK, to implement a public key infrastructure (PKI) method or a second cryptographic algorithm to encrypt identity information so as to generate an electronic digital signature (EDS) accordingly.

The second cryptographic algorithm is preferably one selected from an RSA algorithm, a DSA algorithm, an ECDSA algorithm, an ECC algorithm, a HMAC algorithm, an MD5 algorithm, an MD4 algorithm, an MD2 algorithm, an SHA-1 algorithm, an SHA-2 algorithm, an SHA-3 algorithm, a RIPEMD-160 algorithm, an MDC-2 algorithm, a GOST R 34. 11-94 algorithm, a BLAKE2 algorithm, a Whirlpool algorithm, an SM3 algorithm, and combinations thereof.

Step 504: After the electronic digital signature is generated on the user device 100, the first service program 110 is configured to generate, in a random manner or by re-implementing a first cryptographic algorithm, a second ephemeral decryption key (the second EDK/2nd EDK), or alternatively to implement a scrambling process based on the first EDK to vary the first EDK to generate a second EDK. The form of the first and second EDKs is preferably, but not limited to, a symbolic string of binary bit lengths of 32, 64, 128 or 256.

In some embodiments, the first EDK and the second EDK are preferably the same ephemeral decryption key, in order to omit the implementation of the generation process for generating the second EDK and to simplify the overall key generation process.

Step 505: After the second EDK is generated on the user device 100, the first service program 110 continues on the user device 100, based on the second EDK, to implement a third cryptographic algorithm, preferably a symmetric encryption scheme, to further encrypt the electronic digital signature so as to generate an authentication token (Token) accordingly.

The third cryptographic algorithm is preferably one selected from an AES algorithm, a DSA algorithm, an HMAC algorithm, an MD5 algorithm, an MD4 algorithm, an MD2 algorithm, a SHA-1 algorithm, a SHA-2 algorithm, a SHA-3 algorithm, a Blowfish algorithm, a Camellia algorithm, a Chacha20 algorithm, a Poly1305 algorithm, a SEED algorithm, a CAST-128 algorithm, a DES algorithm, an IDEA algorithm, an RC2 algorithm, an RC4 algorithm, an RC5 algorithm, an SM4 algorithm, a TDES algorithm, a GOST 28147-89 algorithm, and a combination thereof.

Step 506: Next, the first service program 110 is configured to publish the generated first and second ephemeral decryption keys from the user device 100 to the cybersecurity server 300, either with further encryption or without further encryption.

Step 507: After the first and second EDKs are received, the third service program 310 running on the cybersecurity server 300 is configured to generate a token index (Index) based on the first and second EDKs. The token index refers to a minimum content or a strictly smaller portion of data at hand that is sufficient to retrieve the first and second EDKs.

Step 508: Then, the first service program 110 running on the user device 100 is configured to request and retrieve the token index from the third service program 310.

Step 509: Next, the first service program 110 is configured to combine one of the electronic digital signature, the authentication token, and the token index to form an ephemeral string (String).

Step 510: The first service program 110 is configured to transmit the ephemeral string from the user device 100 to the application server 200.

Step 511: After the ephemeral string is received, the second service program 210 running on the application server 200 is configured to parse the ephemeral string to extract the electronic digital signature, the token index, or the authentication token.

Step 512: The second service program 210 is configured to transmit the obtained token index to the third service program 310 on the cybersecurity server 300 via an encrypted transmission or an unencrypted transmission, to claim the corresponding first and second EDKs based on the token index.

Step 513: The second service program 210 is configured to retrieve the first and second EDKs from the third service program 310.

Step 514: Next, the second service program 210 is configured to perform a token examination process based on the retrieved second ephemeral decryption key to verify whether the authentication token has been altered during transmission to confirm the authenticity of the authentication token.

Step 515: Then, after the second service program 210 successfully confirms that the authentication token is authentic, it is configured to implement the second and third cryptographic algorithms based on the retrieved first and second ephemeral decryption keys, respectively, to decrypt the authentication token and the electronic digital signature, respectively and sequentially, to obtain the identity information.

Step 516: After the identity information is obtained, the second service program 210 is configured to execute an identity examination process to verify whether the electronic digital signature is a valid algorithmic signing and the identity information correctly matches the data of record such as, for example, in the Identity-Binding whitelist Database, in order to assert the correctness of the identity information.

Step 517: The second service program 210 is configured to report the identity examination result back to the first service program 110. If the identity information is confirmed to be correct, a match message is returned to the first service program 110; otherwise, a mismatch message is returned.

Step 518: If the first service program 110 successfully confirms that the identity authentication result is a match, it proceeds to perform the login OK process.

In addition, at the first time when the user first activates the fourth service program 410, the fourth service program 410 is compulsorily bound to the first service program 110, in particular to be bound to the identity information embedded in the first service program 110, and is authenticated by an identity authentication process, by implementing the aforementioned first-tier multi-party multi-factor dynamic strong encryption identity authentication method 500.

Figure 5:
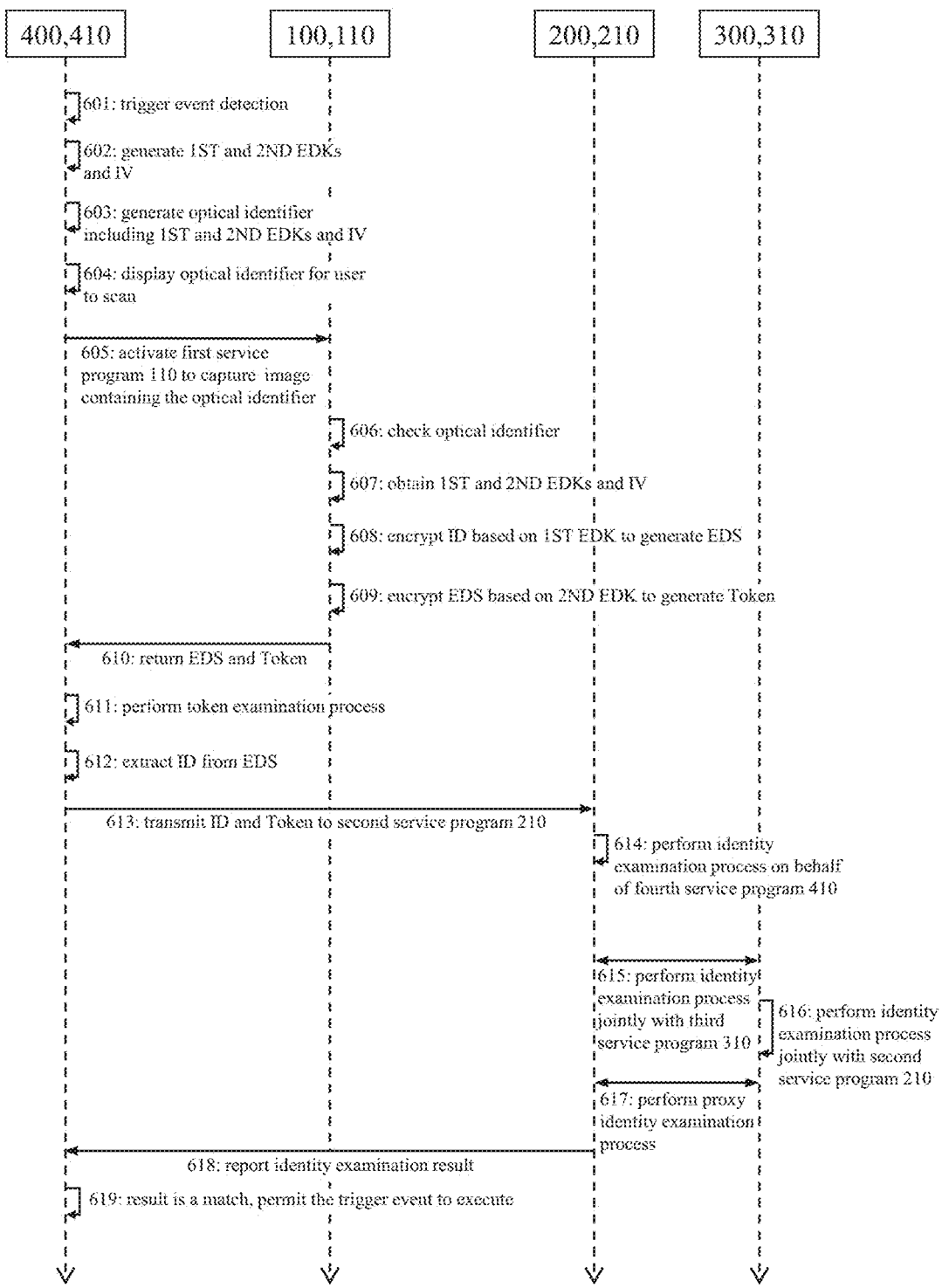
FIG. 5 is the sequence diagram illustrating the implementation steps for the identity re-authentication process included in the present invention.

FIG. 5 is the sequence diagram illustrating the implementation steps for the identity re-authentication process included in the present invention. The identity re-authentication process 600 includes steps as follows.

Step 601: The fourth service program 410, installed and running on the virus protection computer 400, is configured to detect whether a trigger event occurs.

Step 602: When the occurrence of the trigger event is detected, in response to the trigger event, the fourth service program 410 is configured to generate, in a random manner or by implementing the first cryptographic algorithm, a first and second ephemeral keys and an initialization vector (IV), or alternatively to implement a scrambling process based on the first EDK to modify the first EDK to generate a second EDK.

Step 603: The fourth service program 410 is configured to generate an optical identifier and to incorporate the first and second ephemeral decryption keys, the IV, and the IP address of the optical identifier into the optical identifier by following optical identifier encoding rules. The optical identifier stores the EDKs, the IV and the IP address and has a form including, but not limited to, a two-dimensional spatial code such as a quick response (QR) code.

Step 604: Next, the fourth service program 410 is configured to display the generated optical identifier on the topmost layer in the screen of the virus protection computer 400, rendering it available for the user to scan and read.

Step 605: The user then activates the first service program 110 installed on the user device 100, and enters the identifier scanning interface provided by the first service program 110, and then captures the image containing the optical identifier using the camera included in the user device 100.

Step 606: After the first service program 110 successfully captures the optical identifier displayed on the virus protection computer 400, the first service program 110 is configured to check whether the captured optical identifier conforms to the optical identifier encoding rules to verify the authenticity of the optical identifier.

Step 607: After the first service program 110 successfully confirms that the optical identifier is authentic, it is configured to decode the optical identifier according to the optical identifier encoding rules, to obtain the first and second ephemeral decryption keys and IV information stored within the optical identifier.

Step 608: Then, the first service program 110 is configured to implement the public key infrastructure (PKI) method or the second cryptographic algorithm based on the first ephemeral decryption key and the IV information to encrypt identity information to generate an electronic digital signature.

Step 609: Next, the first service program 110 is configured to implement the third cryptographic algorithm based on the second ephemeral decryption key to further encrypt the electronic digital signature to generate an authentication token.

Step 610: Next, the first service program 110 is configured to return the authentication token and the electronic digital signature to the fourth service program 410.

Step 611: After the authentication token and the electronic digital signature are successfully received, the fourth service program 410 is configured to first perform a token examination process based on the second ephemeral decryption key to to verify whether the authentication token has been altered during transmission to verify the authenticity of the authentication token.

Step 612: After the fourth service program 410 successfully confirms that the authentication token is authentic, it is configured to implement the second and third cryptographic algorithms based on the first and second ephemeral decryption keys, respectively, to decrypt the authentication token and the electronic digital signature, respectively, sequentially, thereby extracting the identity information.

Step 613: The fourth service program 410 is configured to transmit the identity information and the authentication token to the second service program 210 running on the application server 200.

Step 614: After the identity information and the authentication token are received, the second service program 210 is configured to communicate and transfer data and information with the third service program 310 on behalf of the fourth service program 410 so as to perform the identity examination process, including performing the steps 512 to 517.

Step 615: The second service program 210 is configured to jointly cooperate with the third service program 310 to perform the identity examination process.

Step 616: The third service program 310 is configured to jointly cooperate with the second service program 210 to perform the identity examination process.

Step 617: The second service program 210 is configured to perform a proxy identity examination process.

Step 618: The second service program 210 is configured to report the identity examination result back to the fourth service program 410. If the identity information is confirmed to be correct, a match message is returned to the fourth service program 410; otherwise, a mismatch message is returned.

Step 619: If the fourth service program 410 successfully confirms that the identity authentication result is a match, it permits the execution of the trigger event.

In some embodiments, the fourth service program 410 is configured to further provide functions for the antivirus computer 400 as follows. (1) To monitor and block the use and modification of macros in Microsoft® Office, wherein attempts by users to enable macros in Microsoft® Office are intercepted by the fourth service program 410 unless the user can pass identity authentication by the second service program 210 and the QR code. (2) To monitor and block use and modification in Windows® Defender, wherein attempts by users to modify configurations in Windows® Defender, such as opening ports or applications, are intercepted by the fourth service program 410 unless the user can pass identity authentication by the second service program 210 and the QR code.

(3) By the means to configure the software whitelist, to monitor and block the use and modification of applications, wherein the applications not available on the software whitelist cannot be activated. (4) By the means to configure the hardware whitelist, to monitor and block the use and modification of hardware such as USB keyboards and external drives, wherein the devices not available on the hardware whitelist cannot be used. (5) To provide strict and frequent identity authentication checkpoints to ensure strict virus protection for the user's computer.

The fourth service program 410 according to the present invention is configured to constantly detect the occurrence of trigger events, which include, but are not limited to: a first login, any login, a system status change, a Setting(s) change, a software whitelist change, a hardware whitelist change, an operation, and a detection of an anomaly in the software whitelist, and so on. Whenever the fourth service program 410 detects that a trigger event occurs, it is configured to force the user to go through the identity re-authentication process, thereby providing strict and frequent identity authentication checkpoints for the user's identity, to ensure strict virus protection for the user's computer.

The actual examples of the software whitelist anomaly event include but are not limited to: applications listed on the software whitelist are detected to have anomalies in their macro files such as, for example, the combined digest/checksum of multiple DLL files called by the macro EXE file of an application listed on the software whitelist does not match record (indicating that at least one DLL file or the main EXE file has been tampered) or that there is no established certification record of the DLL/EXE digest/checksum.

Figure 6:
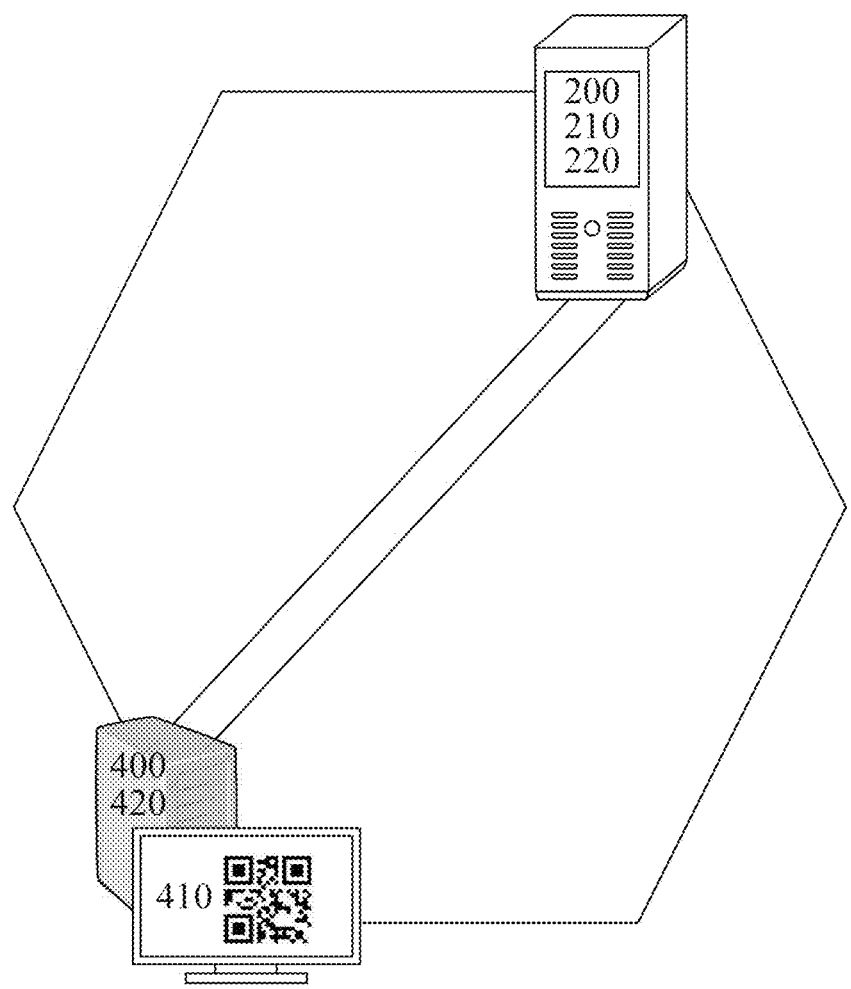
FIG. 6 is a schematic diagram illustrating the hardware architecture for the whitelist anomaly detection scheme included in the present invention.

FIG. 6 is a schematic diagram illustrating the hardware architecture for the whitelist anomaly detection scheme included in the present invention. In order to monitor and detect any whitelist anomaly event, a beacon server service program 220 and a beacon client service program 420 are deployed on the application server 200 and the virus protection computer 400, respectively. The beacon client service program 420 is configured to operate in the form of a daemon program on the virus protection computer 400. The purpose of the beacon server service program 220 is to monitor whether the fourth service program (TP-AVK) 410 has been unexpectedly closed or has stopped functioning due to an attack.

First, the beacon server service program 220 is established and installed on the application server 200 to receive messages from the beacon client service program 420 on the virus protection computer 400. If the beacon client service program 420 responds with a detection of a whitelist anomaly event, the beacon server service program 220 takes appropriate actions, such as, notifying relevant personnel, via emails, SMS, or push notifications, for handling. In addition, if no response is received from the beacon client service program 420 within a predetermined period of time, the corresponding virus protection computer 400 is determined as in anomaly status, and appropriate measures are further taken, such as, notifying relevant personnel, via email, SMS, or push notifications, for handling.

Next, the beacon client service program 420 is installed on the virus protection computer 400 to monitor and scan the operating status of the fourth service program 410. If the fourth service program 410 is closed without authorization, the beacon client service program 420 will not receive a response or an echo from the fourth service program 410. In this case, the beacon client service program 420 sends an alert message to the beacon server service program 220. When the beacon server service program 220 receives the alert message, it notifies relevant personnel, via email, SMS, or push notifications, for further handling, according to the settings.

The criteria and logic for determining whitelist anomalies are mainly based on the following rules:

Rule A for detecting Unauthorized Changes: Changes that have not been authenticated by the fourth service program 410. It means before making any changes to the whitelist, the identity re-authentication process must be performed by scanning the QR Code using the fourth service program 410. If an unauthorized change is made and detected, the fourth service program 410 notifies the beacon server service program 220 through the beacon client service program 420.

Rule B for detecting Unauthorized Tampered Whitelist Data: The stored whitelist data is encrypted along with a secure message-digest for tamper detection before storage. If anyone tampers with the data without authorization, the fourth service program 410 notifies the beacon server service program 220 through the beacon client service program 420.

Rule C for detecting Hash Value Verification: When any whitelisted application is initially set up, a hash value is calculated using SHA-256 and attached to the corresponding whitelisted application. Therefore, if someone attempts to run an application with the same name, but the hash value does not match after comparison, the fourth service program 410 notifies the beacon server service program 220 through the beacon client service program 420.

Figure 7:
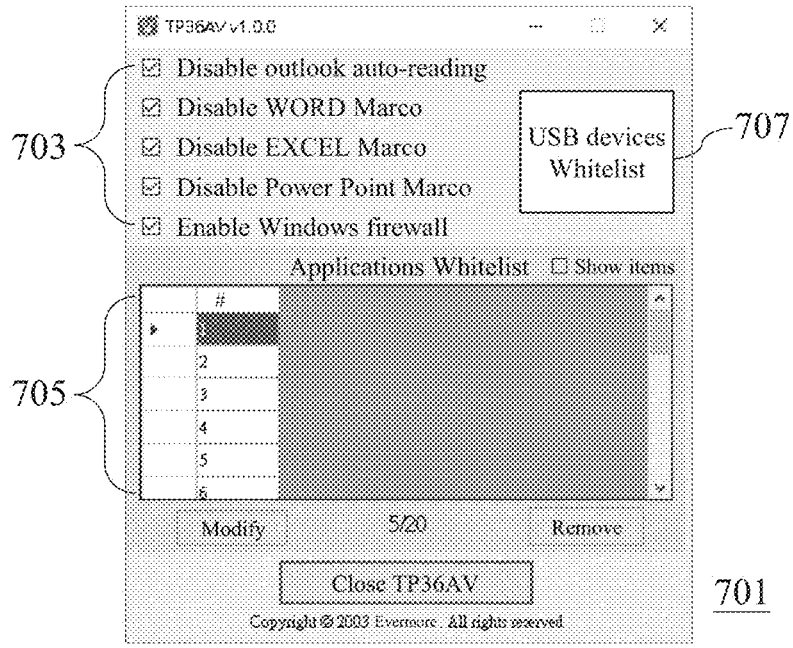
FIG. 7 is a first schematic diagram illustrating the main page included in the fourth service program according to the present invention.

FIG. 7 is a first schematic diagram illustrating the main page included in the fourth service program according to the present invention. In some embodiments, the fourth service program 410 is configured by default to block Outlook from automatically reading emails, to disable macros in WORD, EXCEL, Power Point, and to enable the Windows® firewall, by modifying the Windows® registry.

The main interface 701 provided by the fourth service program 410, as illustrated in FIG. 4, includes a default status setting area 703, an applications whitelist 705, and a USB devices whitelist button 707. The default status setting area 703 displays the default status of the system as: Outlook auto-reading disabled, WORD macro functions disabled, EXCEL macro functions disabled, Power Point macro functions disabled, and Windows® firewall enabled. For security reasons, the applications whitelist 705 is shielded by a colour block to hide its contents.

Figure 8:
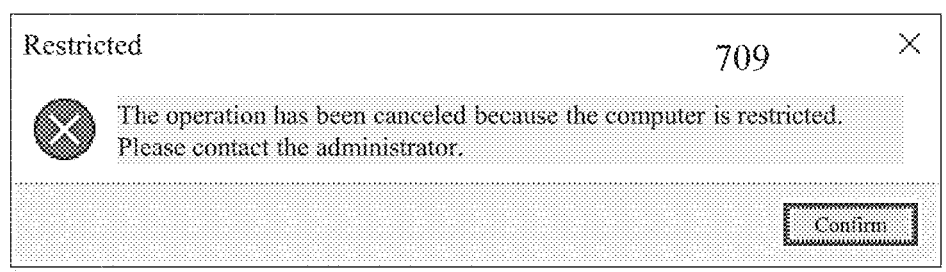
FIG. 8 is a schematic diagram illustrating the lock status prompt window included in the present invention.

FIG. 8 is a schematic diagram illustrating the lock status prompt window included in the present invention. After the fourth service program 410 is activated, it is configured to operate according to the default status of only permitting the Windows® operating system to execute applications listed on the whitelist. If a user attempts to launch an application not available on the whitelist, the system is configured to display a lock status prompt window 709.

When a user attempts to enable a particular application, the fourth service program 410 is configured to require the user to go through identity re-authentication. For example, if a user wishes to enable the auto-reading function in Outlook, the user can change the status of the checkbox in the default status setting area 703 from checked to unchecked (blanked).

Since a change in the checkbox status is, by definition, a configuration change, the fourth service program 410 is configured to identify this action as a trigger event. Therefore, when the fourth service program 410 detects the change in checkbox status as a trigger event, it is configured to initiate the identity re-authentication process 600.

Figure 9:
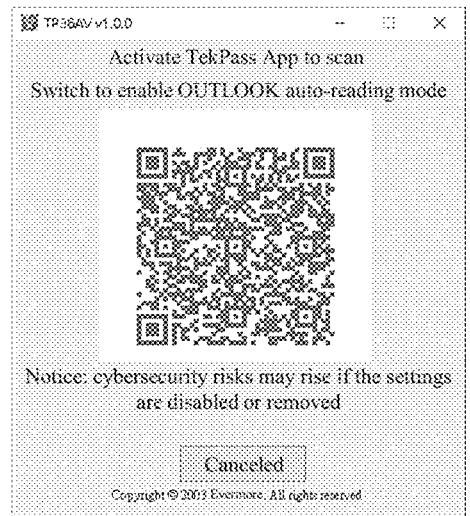
FIG. 9 is a schematic diagram illustrating the first identity re-authentication window included in the present invention.

FIG. 9 is a schematic diagram illustrating the first identity re-authentication window included in the present invention. The implementation of the identity re-authentication process 600 includes: initially performing the steps 601 to 604, when a trigger event occurs and is detected, the fourth service program 410 is configured to display a first identity re-authentication window 711 on the topmost layer in the screen, wherein the first identity re-authentication window 711 contains a QR code pattern.

Then performing step 605, wherein the user is required to open the first service program 110 installed on the user device 100, enter the identifier scanning interface provided by the first service program 110, and then capture the QR code pattern using the camera lens on the user device 100.

After the first service program 110 receives the QR code pattern, it is configured to automatically complete the execution of the steps 606 to 618, including the execution of the steps 512 to 517 included in the step 614, and finally the execution of the step 619. When the fourth service program 410 is configured to receive the identity re-authentication result as a match, it permits the execution of the trigger event, such as enabling the auto-reading function in Outlook.

Similarly, the user may also deselect the option to turn on the Windows® firewall in the default status setting area 703, thereby disabling the Windows® firewall. Since the operation to disable the Windows® firewall is by definition an operation that performs a setting change, the fourth service program 410 is configured to reinitiate and perform the identity re-authentication process 600.

Figure 10:
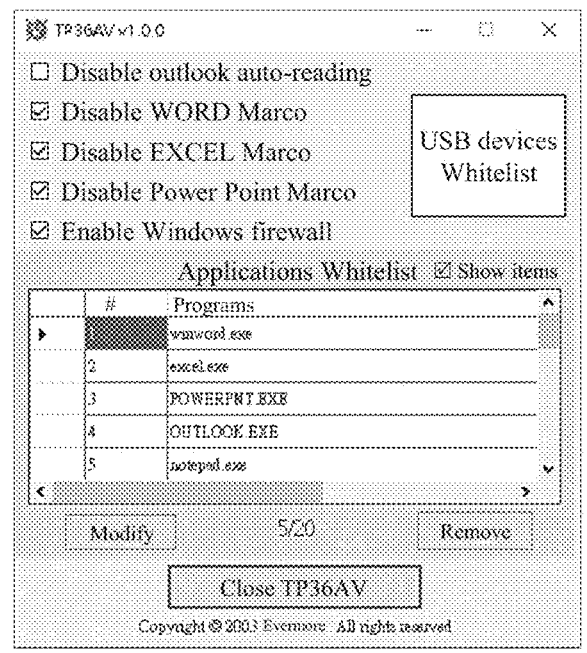
FIG. 10 is a second schematic diagram illustrating the main page included in the fourth service program according to the present invention.

FIG. 10 is a second schematic diagram illustrating the main page included in the fourth service program according to the present invention. After the the fourth service program 410 executes the trigger event, which is to permit the Outlook auto-reading function to be enabled, it is viewed from the default status setting area 703 in the main page 701 that the checkbox corresponding to the item for disabling the Outlook auto-reading function changes to an unchecked (blanked) status.

Figure 11:
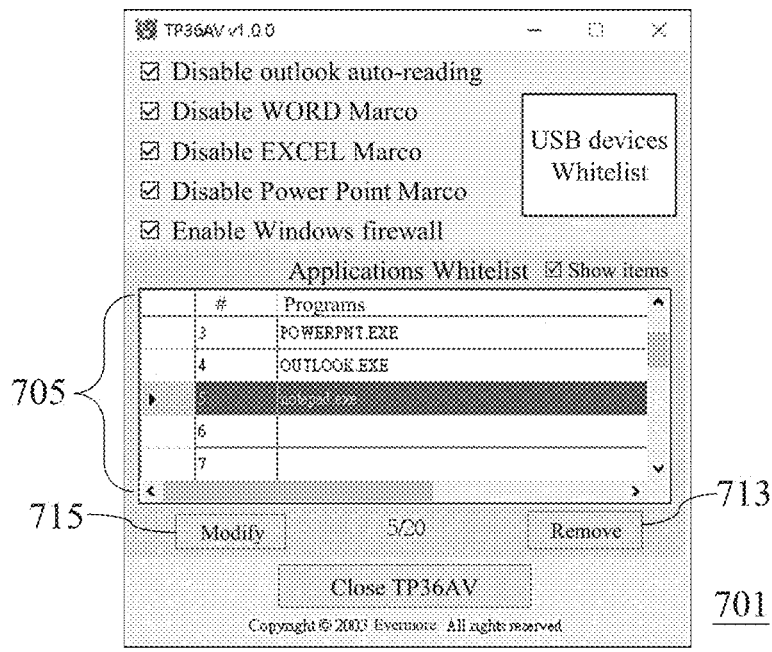
FIG. 11 is a third schematic diagram illustrating the main page included in the fourth service program according to the present invention.
Figure 12:
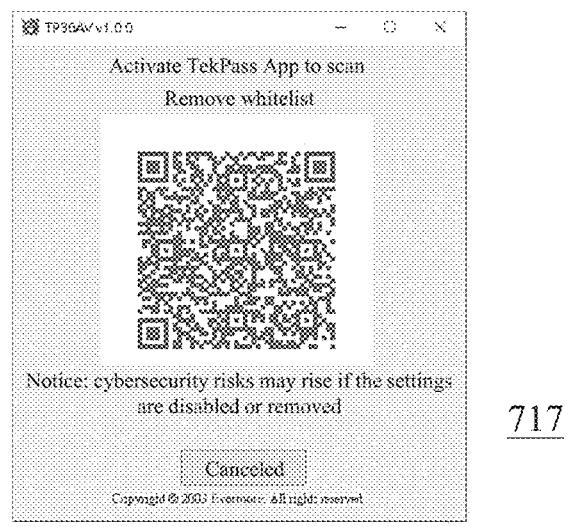
FIG. 12 is a schematic diagram illustrating the first identity re-authentication window included in the present invention.

FIG. 11 is a third schematic diagram illustrating the main page included in the fourth service program according to the present invention. FIG. 12 is a schematic diagram illustrating the first identity re-authentication window included in the present invention. When a user attempts to close/disable a particular application, the user needs only remove the particular application from the applications whitelist 705.

In some embodiments, for example, in order to remove the Notepad application, the current number of applications configured to be opened shown in the applications whitelist 705 on the main page 701 is 5. If the user wishes to remove the Notepad application, the user may select the item with the name of notepad.exe from the applications whitelist 705 and click the remove button 713 on the main page. Then, by scanning the QR code displayed in the second identity re-authentication window 717, if the identity re-authentication passes successfully, the Notepad application is successfully removed from the applications whitelist 705.

Since removing an application is, by definition, an operation to change the software whitelist, the fourth service program 410 is configured to identify the operation as a trigger event. Therefore, when the fourth service program 410 detects that the user clicks the remove button 713 on the main page 701, it is configured to initiate the identity re-authentication process 600, to generate a second identity re-authentication window 717 containing a QR code for the user to scan to perform the identity re-authentication.

Similarly, if a user wishes to add an application into the applications whitelist 705, the user may click the modify button 715 on the main page 701 and then enters the application name and extension into the applications whitelist 705. Since adding applications is, by definition, an operation to change the software whitelist, the fourth service program 410 is configured to perform a double check via a QR code by initiating the identity re-authentication process for the user.

The fourth service program 410 is further configured to provide the monitoring and blocking function for hardware devices such as USB keyboards and external hard drives. A user may set a USB devices whitelist by oneself. If a hardware device is not listed on the USB devices whitelist, it cannot be enabled or is always disabled.

Figure 13:
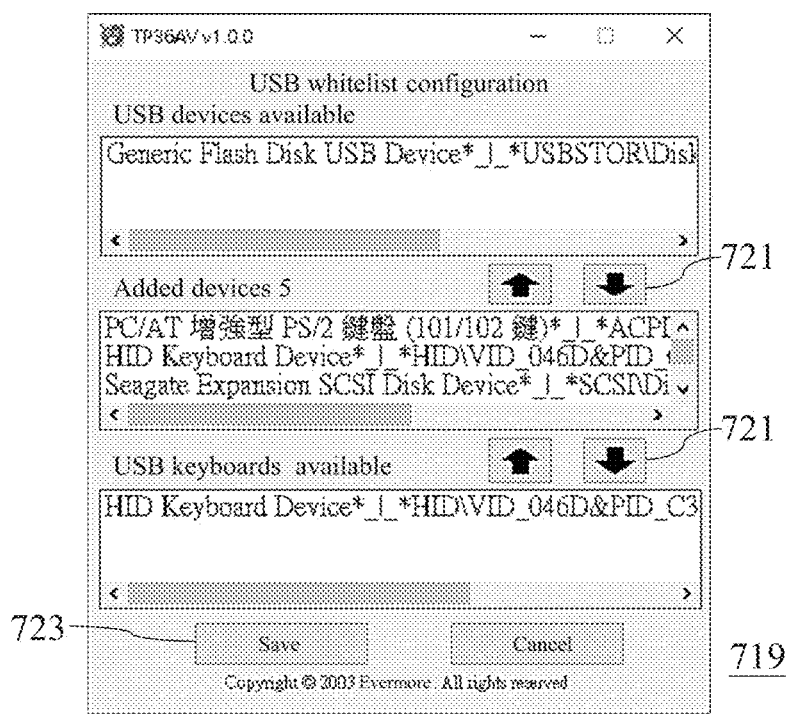
FIG. 13 is a schematic diagram illustrating the USB devices whitelist configuration page included in the fourth service program according to the present invention.

FIG. 13 is a schematic diagram illustrating the USB devices whitelist configuration page included in the fourth service program according to the present invention. By clicking on the USB devices whitelist button 707 at the top right of the main page 701, the user enters the USB devices whitelist configuration page 719 containing a USB devices whitelist. The fourth service program 410 is configured by default to add the keyboard and the USB flash drive devices currently in use on the computer into the USB devices whitelist.

As illustrated in FIG. 13, in the USB devices whitelist configuration page 719, the fourth service program 410 is configured to automatically display the available USB devices. When the fourth service program 410 detects that a new USB hard drive and a new USB keyboard are available for selection and addition to the USB devices whitelist, it is configured to display the available devices in the available devices field. The user can add and remove a particular USB device by clicking on the arrow button 721 included in the USB devices whitelist configuration page 719. When the user completes the configuration, by clicking on the Save button 723, the configuration according to the USB devices whitelist is recorded and configured. Once the configuration is complete, the system is configured to block the hardware devices that are not available on the USB devices whitelist.

Since changing the USB devices whitelist is, by definition, an operation to change the hardware whitelist, the fourth service program 410 is configured to determine the operation as a trigger event. Therefore, when the fourth service program 410 detects that the user clicks on the Save button 723 on the main page, the fourth service program 410 is configured to perform an identity re-authentication process 600 to generate a QR code. After the user scans the QR code and passes the identity re-authentication, the configuration for the USB devices whitelist is complete.

Figure 14:
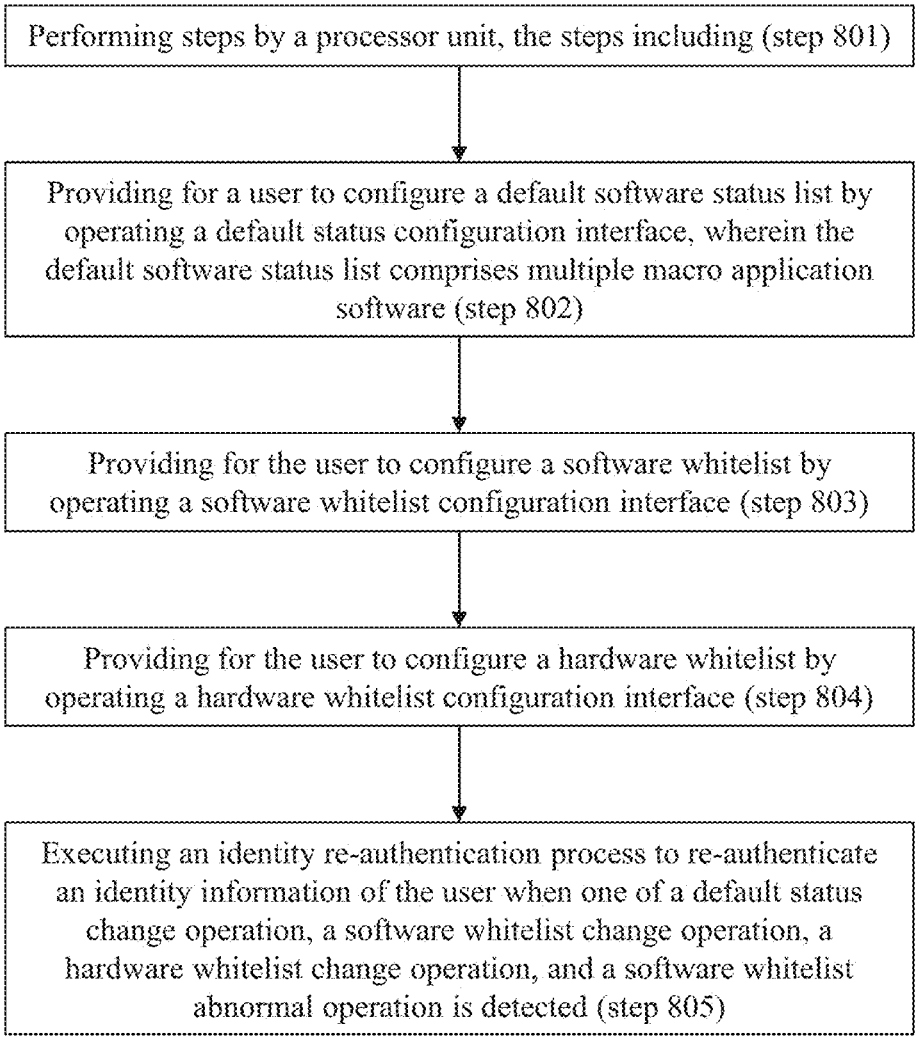
FIG. 14 is a flow chart showing the implementation steps for the virus interception method included in the present invention.

FIG. 14 is a flow chart showing the implementation steps for the virus interception method included in the present invention. The virus interception method 800 according to the present invention preferably includes but is not limited to the steps as follows: performing steps by a processor unit, the steps including (step 801): providing for a user to configure a default software status list by operating a default status configuration interface, wherein the default software status list comprises multiple macro application software (step 802); providing for the user to configure a software whitelist by operating a software whitelist configuration interface (step 803); providing for the user to configure a hardware whitelist by operating a hardware whitelist configuration interface (step 804); and executing an identity re-authentication process to re-authenticate the identity information of the user when one of a default status change operation, a software whitelist change operation, a hardware whitelist change operation, and a software whitelist anomaly is detected (step 805).

In summary, the virus interception method provided by the present invention is to change the way applications and hardware are used, by reconfiguring the Windows® registry, thereby preventing the abnormal execution of inappropriate software and unauthorized hardware. The virus interception method provided by the present invention is configured to re-authenticate the identity information through, for example, the Tekpass App. All actions performed in the virus interception method including startup, settings, configurations, and modifications, require the identity re-authentication to be performed via a one-time QR code and the exemplary Tekpass App, to achieve the system-level control by modifying the Windows® registry.

There are further embodiments provided as follows.

Embodiment 1: A computer virus interception method includes: performing following steps by a processor unit: providing for a user to configure a default software status list by operating a default status configuration interface, wherein the default software status list includes a plurality of macro application software; providing for the user to configure a software whitelist by operating a software whitelist configuration interface; providing for the user to configure a hardware whitelist by operating a hardware whitelist configuration interface; and executing an identity re-authentication process to re-authenticate the identity information of the user when one of a default status change operation, a software whitelist change operation, a hardware whitelist change operation, and a software whitelist anomaly is detected.

Embodiment 2: The computer virus interception method according to Embodiment 1, further includes: disabling the plurality of macro application software by default; disabling a first application by default; enabling a first peripheral hardware in operation by default; providing for the user to configure the default software status list to enable or disable the plurality of macro application software included in the default software status list by operating the default status configuration interface; providing for the user to add the first application to the software whitelist by operating the software whitelist configuration interface to permit execution of the first application; providing for the user to add a second peripheral hardware to the hardware whitelist by operating the hardware whitelist configuration interface to permit execution of the second peripheral hardware; and detecting whether a trigger event occurs, and when the occurrence of the trigger event is detected, performing the identity re-authentication process to re-authenticate the identity information of the user, wherein the trigger event includes one of the default status change operation changing the default software status list, the software whitelist change operation changing the software whitelist, the hardware whitelist change operation changing the hardware whitelist, and the software whitelist anomaly.

Embodiment 3: The computer virus interception method according to Embodiment 1, further includes: a first-tier multi-party multi-factor dynamic strong encryption identity authentication method, wherein the first-tier multi-party multi-factor dynamic strong encryption identity authentication method includes one of following steps: on a user device owned by the user: selectively implementing a first cryptographic algorithm to generate a first ephemeral decryption key or randomly generating the first ephemeral decryption key; selectively encrypting the identity information based on the first ephemeral decryption key by implementing a second cryptographic algorithm to generate an electronic digital signature; generating a second ephemeral decryption key based on a part of the first ephemeral decryption key or randomly generating the second ephemeral decryption key; encrypting the electronic digital signature based on the second ephemeral decryption key by implementing a third cryptographic algorithm to generate an authentication token; publishing the first ephemeral decryption key and the second ephemeral decryption key to a secure server and retrieving a token index from the secure server; combining one of the identity information, the electronic digital signature, the token index, and the authentication token to form an ephemeral string; and transmitting the ephemeral string to an application server; and on the application server: parsing the ephemeral string to obtain one of the identity information, the electronic digital signature, the token index, and the authentication token; retrieving the first ephemeral decryption key and the second ephemeral decryption key from the secure server based on the token index; performing a token examination process to authenticate whether the authentication token is altered during the transmission; decrypting the electronic digital signature and the authentication token based on the first ephemeral decryption key and the second ephemeral decryption key to retrieve the identity information, when the authentication token is not altered; and performing an identity examination process to verify whether the electronic digital signature is algorithmically valid and the identity information matches a record.

Embodiment 4: The computer virus interception method according to Embodiment 3, further includes the identity re-authentication process, wherein the identity re-authentication process includes: on a computer virus protection computer including the processor unit, in response to the occurrence of the trigger event: selectively implementing the first cryptographic algorithm to generate the first ephemeral decryption key and the second ephemeral decryption key or randomly generating the first ephemeral decryption key and the second ephemeral decryption key; generating an optical identifier and storing the first ephemeral decryption key and the second ephemeral decryption key in the optical identifier; displaying the optical identifier on a topmost z-position; on the user device: capturing an image including the optical identifier; parsing the optical identifier to obtain the first ephemeral decryption key and the second ephemeral decryption key; selectively encrypting the identity information based on the first ephemeral decryption key by implementing the second cryptographic algorithm to generate the electronic digital signature; encrypting the electronic digital signature based on the second ephemeral decryption key by implementing the third cryptographic algorithm to generate the authentication token; and returning the electronic digital signature and the authentication token back to the computer virus protection computer; and on the computer virus protection computer: performing the token examination process based on the second ephemeral decryption key to verify whether the authentication token is altered or not during transmission; decrypting the electronic digital signature and the authentication token based on the first ephemeral decryption key and the second ephemeral decryption key to retrieve the identity information when the authentication token is not altered; and transmitting the authentication token and the identity information to the application server.

Embodiment 5: The computer virus interception method according to Embodiment 4, the identity re-authentication process further includes: executing following steps by the application server on behalf of the computer virus protection computer claiming the first ephemeral decryption key and the second ephemeral decryption key from the secure server based on the token index; retrieving the first ephemeral decryption key and the second ephemeral decryption key; performing the token examination process based on the second ephemeral decryption key to verify whether the authentication token is altered or not during transmission; decrypting the electronic digital signature and the authentication token based on the first ephemeral decryption key and the second ephemeral decryption key to retrieve the identity information when the authentication token is not altered; and performing the identity examination process to verify whether the electronic digital signature is algorithmically valid and the identity information matches a record.

Embodiment 6: A computer virus interception computer program product, which is embodied on a non-transitory computer-readable storage medium and loaded and executed by a processor unit, includes: a default status configuration module configured to provide for a user to configure a default software status list by operating a default status configuration interface, wherein the default software status list includes a plurality of macro application software; a software whitelist configuration module configured to provide for the user to configure a software whitelist by operating a software whitelist configuration interface; a hardware whitelist configuration module configured to provide for the user to configure a hardware whitelist by operating a hardware whitelist configuration interface; and an identity re-authentication management module configured to detect whether a trigger event occurs, and when the occurrence of the trigger event is detected, performing the identity re-authentication process to re-authenticate the identity information of the user, wherein the trigger event includes one of the default status change operation changing the default software status list, the software whitelist change operation changing the software whitelist, the hardware whitelist change operation changing the hardware whitelist, and the software whitelist anomaly.

Embodiment 7: The computer virus interception computer program product according to Embodiment 6, the computer virus interception computer program product has the authority to modify a registry in an operating system, and is configured to configure settings for the default software status list, the software whitelist, and the hardware whitelist by modifying the registry.

Embodiment 8: The computer virus interception computer program product according to Embodiment 6, the trigger event further includes one of a first login operation for the user to log in to the computer virus interception computer program product for the first time, a login operation for the user to log in to the computer virus interception computer program product each time, a system status change operation, and a settings change operation.

Embodiment 9: The computer virus interception computer program product according to Embodiment 8, the computer virus interception computer program product is configured to operate in the form of a daemon program on a computer virus protection computer and to detect the trigger event by the identity re-authentication management module after execution.

Embodiment 10: A computer virus interception system includes: a computer virus protection computer including a processor unit configured to execute following steps: providing for a user to configure a default software status list by operating a default status configuration interface, wherein the default software status list includes a plurality of macro application software; providing for the user to configure a software whitelist by operating a software whitelist configuration interface; providing for the user to configure a hardware whitelist by operating a hardware whitelist configuration interface; and performing an identity re-authentication process to re-authenticate the identity information of the user when one of a default status change operation, a software whitelist change operation, a hardware whitelist change operation, and a software whitelist anomaly is detected.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A computer virus interception method, comprising:
   performing following steps by a processor unit:
      providing for a user to configure a default software status list by operating a default status configuration interface, wherein the default software status list comprises a plurality of macro application software;
      providing for the user to configure a software whitelist by operating a software whitelist configuration interface;
      providing for the user to configure a hardware whitelist by operating a hardware whitelist configuration interface; and
      executing an identity re-authentication process to re-authenticate an identity information of the user when one of a default status change operation, a software whitelist change operation, a hardware whitelist change operation, or a software whitelist anomaly is detected;
   performing a first-tier multi-party multi-factor dynamic encryption identity authentication method, wherein the first-tier multi-party multi-factor dynamic encryption identity authentication method comprises the following steps:
   on a user device owned by the user:
      selectively implementing a first cryptographic algorithm to generate a first ephemeral decryption key or randomly generating the first ephemeral decryption key;
      selectively encrypting the identity information based on the first ephemeral decryption key by implementing a second cryptographic algorithm to generate an electronic digital signature;
      generating a second ephemeral decryption key based on a part of the first ephemeral decryption key or randomly generating the second ephemeral decryption key;
      encrypting the electronic digital signature based on the second ephemeral decryption key by implementing a third cryptographic algorithm to generate an authentication token;
      publishing the first ephemeral decryption key and the second ephemeral decryption key to a secure server and retrieving a token index from the secure server;
      combining the identity information, the electronic digital signature, the token index, and the authentication token to form an ephemeral string; and
      transmitting the ephemeral string to an application server; and
   on the application server:
      parsing the ephemeral string to obtain one of the identity information, the electronic digital signature, the token index, and the authentication token;
      retrieving the first ephemeral decryption key and the second ephemeral decryption key from the secure server based on the token index;
      performing a token examination process to authenticate whether the authentication token is altered during the transmission;
      decrypting the electronic digital signature and the authentication token based on the first ephemeral decryption key and the second ephemeral decryption key to retrieve the identity information, when the authentication token is not altered; and
      performing an identity examination process to verify whether the electronic digital signature is algorithmically valid and the identity information matches a record.

2. The computer virus interception method according to claim 1, further comprising:
   disabling the plurality of macro application software by default;
   disabling a first application by default;
   enabling a first peripheral hardware in operation by default;
   providing for the user to configure the default software status list to enable or disable the plurality of macro application software included in the default software status list by operating the default status configuration interface;
   providing for the user to add the first application to the software whitelist by operating the software whitelist configuration interface to permit execution of the first application;
   providing for the user to add a second peripheral hardware to the hardware whitelist by operating the hardware whitelist configuration interface to permit operation of the second peripheral hardware; and
   detecting whether a trigger event occurs, and when the occurrence of the trigger event is detected, performing the identity re-authentication process to re-authenticate the identity information of the user, wherein the trigger event comprises one of the default status change operation changing the default software status list, the software whitelist change operation changing the software whitelist, the hardware whitelist change operation changing the hardware whitelist, and the software whitelist anomaly.

3. The computer virus interception method according to claim 1, wherein the identity re-authentication process further comprises:
   on a computer virus protection computer including the processor unit, in response to the occurrence of the trigger event:
      selectively implementing the first cryptographic algorithm to generate the first ephemeral decryption key and the second ephemeral decryption key or randomly generating the first ephemeral decryption key and the second ephemeral decryption key;

generating an optical identifier and storing the first ephemeral decryption key and the second ephemeral decryption key in the optical identifier;

displaying the optical identifier on a topmost position;

on the user device:

capturing an image comprising the optical identifier;

parsing the optical identifier to obtain the first ephemeral decryption key and the second ephemeral decryption key;

selectively encrypting the identity information based on the first ephemeral decryption key by implementing the second cryptographic algorithm to generate the electronic digital signature;

encrypting the electronic digital signature based on the second ephemeral decryption key by implementing the third cryptographic algorithm to generate the authentication token; and returning the electronic digital signature and the authentication token back to the computer virus protection computer; and on the computer virus protection computer:

performing the token examination process based on the second ephemeral decryption key to verify whether the authentication token is altered or not during transmission;

decrypting the electronic digital signature and the authentication token based on the first ephemeral decryption key and the second ephemeral decryption key to retrieve the identity information when the authentication token is not altered; and transmitting the authentication token and the identity information to the application server.

4. The computer virus interception method according to claim 3, wherein the identity re-authentication process further comprises:

executing following steps by the application server on behalf of the computer virus protection computer:

claiming the first ephemeral decryption key and the second ephemeral decryption key from the secure server based on the token index;

retrieving the first ephemeral decryption key and the second ephemeral decryption key;

performing the token examination process based on the second ephemeral decryption key to verify whether the authentication token is altered or not during transmission;

decrypting the electronic digital signature and the authentication token based on the first ephemeral decryption key and the second ephemeral decryption key to retrieve the identity information when the authentication token is not altered; and performing the identity examination process to verify whether the electronic digital signature is algorithmically valid and the identity information matches a record.

5. A computer virus interception computer program product, which is embodied on a non-transitory computer-readable storage medium and loaded and executed by a processor unit, comprising:

a default status configuration module configured to provide for a user to configure a default software status list by operating a default status configuration interface, wherein the default software status list comprises a plurality of macro application software;

a software whitelist configuration module configured to provide for the user to configure a software whitelist by operating a software whitelist configuration interface;

a hardware whitelist configuration module configured to provide for the user to configure a hardware whitelist by operating a hardware whitelist configuration interface; and an identity re-authentication management module configured to detect whether a trigger event occurs, and when the occurrence of the trigger event is detected, performing the identity re-authentication process to re-authenticate the identity information of the user, wherein the trigger event comprises one of the default status change operation changing the default software status list, the software whitelist change operation changing the software whitelist, the hardware whitelist change operation changing the hardware whitelist, or the software whitelist anomaly;

the computer virus interception computer program product causes a user device owned by the user to execute following steps:

selectively implementing a first cryptographic algorithm to generate a first ephemeral decryption key or randomly generating the first ephemeral decryption key;

selectively encrypting the identity information based on the first ephemeral decryption key by implementing a second cryptographic algorithm to generate an electronic digital signature;

generating a second ephemeral decryption key based on a part of the first ephemeral decryption key or randomly generating the second ephemeral decryption key;

encrypting the electronic digital signature based on the second ephemeral decryption key by implementing a third cryptographic algorithm to generate an authentication token;

publishing the first ephemeral decryption key and the second ephemeral decryption key to a secure server and retrieving a token index from the secure server;

combining the identity information, the electronic digital signature, the token index, and the authentication token to form an ephemeral string; and transmitting the ephemeral string to an application server; and the computer virus interception computer program product causes the application server to execute following steps:

parsing the ephemeral string to obtain one of the identity information, the electronic digital signature, the token index, and the authentication token;

retrieving the first ephemeral decryption key and the second ephemeral decryption key from the secure server based on the token index;

performing a token examination process to authenticate whether the authentication token is altered during the transmission;

decrypting the electronic digital signature and the authentication token based on the first ephemeral decryption key and the second ephemeral decryption key to retrieve the identity information, when the authentication token is not altered; and performing an identity examination process to verify whether the electronic digital signature is algorithmically valid and the identity information matches a record.

6. The computer virus interception computer program product according to claim 5, wherein the computer virus interception computer program product has an authority to modify a registry in an operating system, and is configured to configure settings for the default software status list, the software whitelist, and the hardware whitelist by modifying the registry.

7. The computer virus interception computer program product according to claim 5, wherein the trigger event further comprises one of a first login operation for the user to log in to the computer virus interception computer program product for the first time, a login operation for the user to log in to the computer virus interception computer program product each time, a system status change operation, and a settings change operation.

8. The computer virus interception computer program product according to claim 7, wherein the computer virus interception computer program product is configured to operate in the form of a daemon program on a computer virus protection computer and to detect the trigger event by the identity re-authentication management module after execution.

9. A computer virus interception system comprising:
a computer virus protection computer comprising a processor unit configured to execute following steps:
providing for a user to configure a default software status list by operating a default status configuration interface, wherein the default software status list comprises a plurality of macro application software;
providing for the user to configure a software whitelist by operating a software whitelist configuration interface;
providing for the user to configure a hardware whitelist by operating a hardware whitelist configuration interface; and
performing an identity re-authentication process to re-authenticate an identity information of the user when one of a default status change operation, a software whitelist change operation, a hardware whitelist change operation, or a software whitelist anomaly is detected;
a user device, owned by the user, configured to execute following steps:
selectively implementing a first cryptographic algorithm to generate a first ephemeral decryption key or randomly generating the first ephemeral decryption key;
selectively encrypting the identity information based on the first ephemeral decryption key by implementing a second cryptographic algorithm to generate an electronic digital signature;
generating a second ephemeral decryption key based on a part of the first ephemeral decryption key or randomly generating the second ephemeral decryption key;
encrypting the electronic digital signature based on the second ephemeral decryption key by implementing a third cryptographic algorithm to generate an authentication token;
publishing the first ephemeral decryption key and the second ephemeral decryption key to a secure server and retrieving a token index from the secure server;
combining the identity information, the electronic digital signature, the token index, and the authentication token to form an ephemeral string; and
transmitting the ephemeral string to an application server; and
the application server configured to execute following steps:
parsing the ephemeral string to obtain one of the identity information, the electronic digital signature, the token index, and the authentication token;
retrieving the first ephemeral decryption key and the second ephemeral decryption key from the secure server based on the token index;
performing a token examination process to authenticate whether the authentication token is altered during the transmission;
decrypting the electronic digital signature and the authentication token based on the first ephemeral decryption key and the second ephemeral decryption key to retrieve the identity information, when the authentication token is not altered; and
performing an identity examination process to verify whether the electronic digital signature is algorithmically valid and the identity information matches a record.

* * * * *